(12) United States Patent
Tuan

(10) Patent No.: US 10,775,643 B2
(45) Date of Patent: Sep. 15, 2020

(54) DYNAMIC PRESBYOPIA CORRECTION IN ELECTRONIC CONTACT LENSES

(71) Applicant: Spy Eye, LLC, Palo Alto, CA (US)

(72) Inventor: Kuang-mon Ashley Tuan, Mountain View, CA (US)

(73) Assignee: Tectus Corporation, Saratoga, CA (US)

( * ) Notice: Subject to any disclaimer, the term of this patent is extended or adjusted under 35 U.S.C. 154(b) by 167 days.

(21) Appl. No.: 16/120,221

(22) Filed: Sep. 1, 2018

(65) Prior Publication Data

US 2020/0073144 A1    Mar. 5, 2020

(51) Int. Cl.

| | |
|---|---|
| G02C 7/00 | (2006.01) |
| G02C 5/00 | (2006.01) |
| G02C 7/02 | (2006.01) |
| A61B 3/00 | (2006.01) |
| A61B 3/10 | (2006.01) |
| G02C 7/04 | (2006.01) |
| G02B 27/01 | (2006.01) |
| G02C 7/08 | (2006.01) |

(52) U.S. Cl.
CPC ......... *G02C 7/041* (2013.01); *G02B 27/0172* (2013.01); *G02C 7/083* (2013.01)

(58) Field of Classification Search
CPC ... G02C 7/04; G02C 5/00; G02C 7/02; G02C 7/06; G02C 7/061; G02C 7/08; G02C 7/10; A61B 3/103; A61B 3/125; A61B 3/024; A61B 3/1015; A61B 3/107; B29D 11/00826

USPC ...... 351/159.03, 41, 159.01, 159.02, 159.05, 351/159.06, 159.1, 159.34, 159.39, 351/159.41, 159.4, 159.42, 159.43, 351/159.49, 159.52, 159.75, 159.76, 200, 351/205, 219, 222, 246–247

See application file for complete search history.

(56) References Cited

U.S. PATENT DOCUMENTS

| | | |
|---|---|---|
| 6,851,805 B2 | 2/2005 | Nblum et al. |
| 8,786,675 B2 | 7/2014 | Deering |
| 9,366,881 B2 | 6/2016 | Pugh et al. |

(Continued)

OTHER PUBLICATIONS

Bailey, J. et al., "Switchable Liquid Crystal Contact Lenses for the Correction of Presbyopia," *Crystals*, vol. 8, Issue 1, 2018, 24 pages.

(Continued)

*Primary Examiner* — Dawayne Pinkney
(74) *Attorney, Agent, or Firm* — Fenwick & West LLP

(57) ABSTRACT

An electronic contact lens can address the effects of presbyopia, aiding a user in adjusting focus when viewing objects at different distances from the user. The electronic contact lens includes a liquid crystal matrix. When the electronic contact lens is configured to operate in a reading mode, an aperture is formed within the liquid crystal matrix by configuring elements of the liquid crystal matrix immediately surrounding the aperture to block light from passing through the surrounding elements. The resulting aperture increases the focus of light passing through the aperture as a result of the pinhole effect. The aperture can be centered within the user's visual axis, and the location within the liquid crystal matrix corresponding to the user's visual axis can be determined during a calibration of the electronic contact lens.

18 Claims, 6 Drawing Sheets

(56) References Cited

U.S. PATENT DOCUMENTS

| | | | |
|---|---|---|---|
| 9,642,699 B2 | 5/2017 | Wortz et al. | |
| 9,775,513 B1 | 10/2017 | Ho et al. | |
| 9,798,217 B2 | 10/2017 | Galstian et al. | |
| 2002/0140899 A1* | 10/2002 | Blum | G02B 27/017 351/159.03 |
| 2004/0156021 A1* | 8/2004 | Blum | A61B 3/0285 351/233 |
| 2008/0151175 A1* | 6/2008 | Gross | G02C 7/086 351/45 |
| 2016/0081793 A1 | 3/2016 | Galstian et al. | |
| 2016/0106533 A1 | 4/2016 | Galstian et al. | |
| 2016/0170097 A1 | 6/2016 | Milton et al. | |
| 2017/0003539 A1 | 1/2017 | Nystrom et al. | |
| 2018/0008141 A1* | 1/2018 | Krueger | A61B 5/744 |
| 2018/0088352 A1 | 3/2018 | Kennedy et al. | |
| 2018/0224671 A1 | 8/2018 | Lemoff et al. | |
| 2018/0231801 A1 | 8/2018 | Gutierrez et al. | |

OTHER PUBLICATIONS

De Smet, J. et al., "Design and Wrinkling Behavior of a Contact Lens With an Integrated Liquid Crystal Light Modulator," *Journal of Display Technology*, vol. 8, No. 5, May 2012, pp. 299-305.

De Smet, J., "The Smart Contact Lens: from an Artificial Iris to a Contact Lens Display," Ghent University, Dissertation Thesis, 2014, 223 pages.

Gleeson, H., "Looking—into the future," *Physics World*, Feb. 15, 2018, 5 pages, [Online] Retrieved from the internet <URL:https://physicsworld.com/a/looking-into-the-future/>.

Kaur, S. et al., "Graphene electrodes for adaptive liquid crystal contact lenses," *Optics Express*, vol. 24, Issue 8, 2016, pp. 8782-8787.

Li, G. et al., "Switchable electro-optic diffractive lens with high efficiency for ophthalmic applications," *Proceedings of the National Academy of Sciences of the United States of America*, vol. 103, No. 16, Apr. 18, 2006, pp. 6100-6104.

Syed, I.M. et al., "Novel switching mode in a vertically aligned liquid crystal contact lens," *Optics Express*, vol. 23, Issue 8, Apr. 20, 2015, pp. 9911-9916.

Wu, Y. et al., "Design of retinal-projection-based near-eye display with contact lens," *Optics Express*, vol. 26, Issue 9, Apr. 30, 2018, pp. 11553-11553.

Presbyopia, Wikipedia, 6 pages, [online] [retrieved from the internet Sep. 25, 2018], Retrieved from the internet <https://en.wikipedia.org/wiki/Presbyopia>.

U.S. Appl. No. 15/977,985, filed May 11, 2018, Inventors: Miller et al.

* cited by examiner

DYNAMIC PRESBYOPIA CORRECTION IN ELECTRONIC CONTACT LENSES

BACKGROUND

1. Technical Field

This disclosure relates generally to eye-mounted electronics and, more particularly, to electronic contact lenses that correct presbyopia.

2. Description of Related Art

Electronic contact lenses can include electronic components to perform a number of functions, for instance using tiny video projectors (or "femtoprojectors") as described in Deering (U.S. Pat. No. 8,786,675) to implement an AR system. The potential for electronic contact lenses to include specialized electronic components makes them an attractive mechanism to address a variety of eye conditions, such as presbyopia.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Introduction

Presbyopia is an eye condition that affects people over 40. It is a consequence of age-related hardening of the lens of the eye which reduces the ability to change focus.

An electronic contact lens can address presbyopia. Whenever the contact lens is configured to operate in a reading mode, a liquid crystal matrix of the contact lens can be configured to include an aperture. The aperture functions as a pinhole, increasing the depth of focus of light passing through the aperture by blocking off-axis light. Such a contact lens can aid a user with presbyopia by enabling the user to focus on close objects.

The aperture can be formed by configuring elements within the liquid crystal matrix surrounding the aperture to block light. The aperture can be located at a location within the liquid crystal matrix corresponding to the user's visual axis. The location within the liquid crystal matrix corresponding to the user's visual axis can be determined when calibrating the contact lens. A user can configure the contact lens to operate in a calibration mode and can provide input to the contact lens indicating a location corresponding to the user's visual axis. The user can subsequently configure the contact lens to operate in a reading mode, in response to which the aperture can be located at the indicated location.

Electronic Contact Lens Architecture

Figure 1:
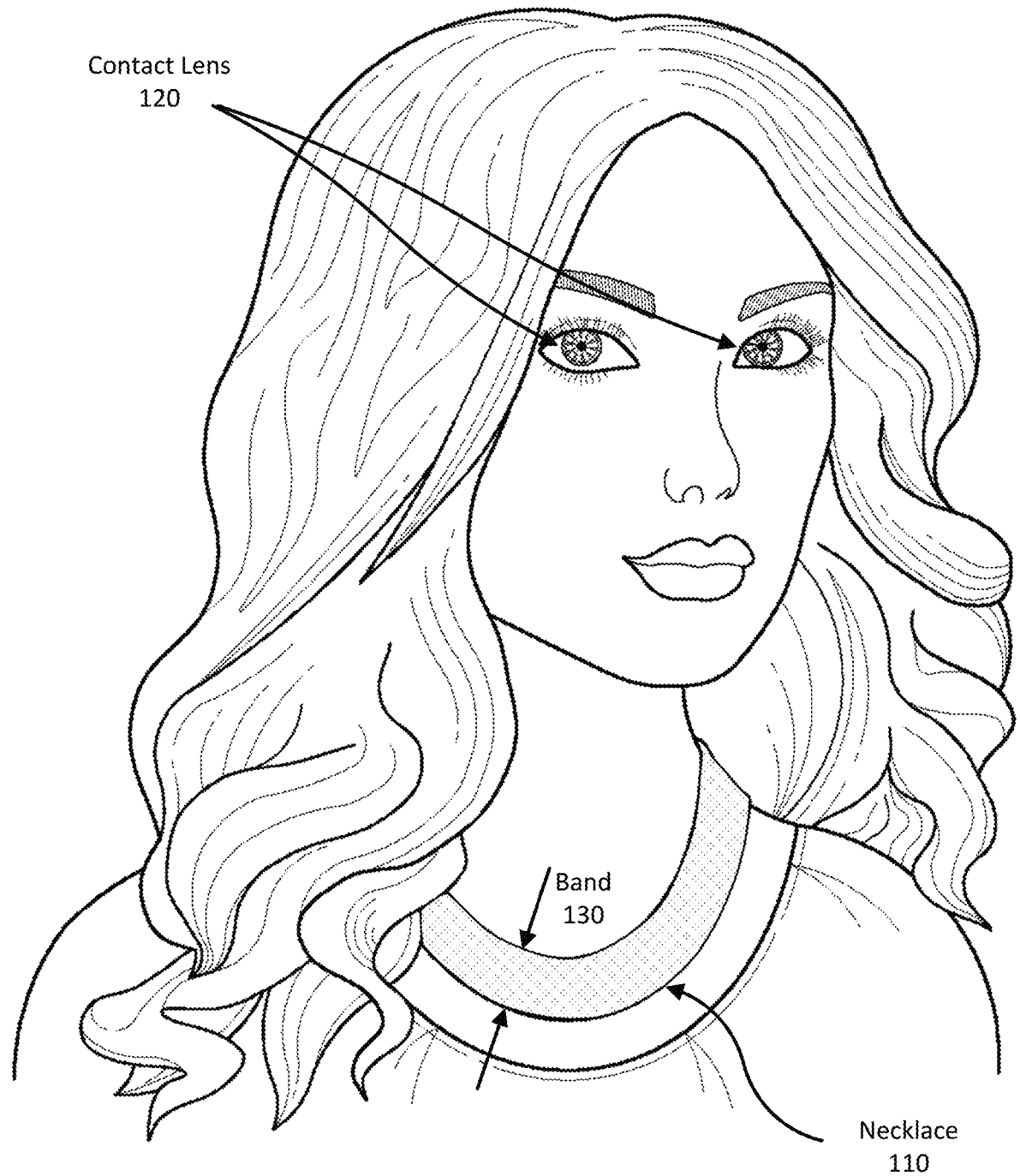
FIG. 1 (FIG. 1) is an illustration of a user wearing an electronic contact lens system.

Turning now to the figures, FIG. 1 is an illustration of a user wearing an electronic contact lens system 100. The electronic contact lens system 100 includes a wireless power source and an electronic contact lens 120 ("contact lens"). In addition to providing power to the contact lens 120, the power source can also transmit data to and receive data from the contact lens. In the illustrated example, the power source is a necklace 110, though in other embodiments, the power source can be embedded within the contact lens, or can be an accessory or device other than a necklace (such as a hat, eyeglasses, earrings or other piece of jewelry, clothing item, or any other suitable wireless power source). The contact lens 120 can include various electronic components that can be, for instance, configured by or operated in response to control signals received from the necklace 110. Additionally, the contact lens 120 can wirelessly communicate with the necklace 110, for instance by providing motion and orientation information representative of the contact lens.

The contact lens 120 can also include other components such as antennae or optical/infrared photodetectors, data storage and buffering, controls, and a calibration system (including, for instance, a motion detection system). In addition, the contact lens 120 can include positioning components such as accelerometers, magnetometers, and gyroscopes used for motion detection, eye tracking, and head tracking. The contact lens 120 can also include data processing components, such as microprocessors, microcontrollers, and other data processing elements configured to, for instance, implement the functionality described herein. Finally, the contact lens 120 can include a liquid crystal matrix to aid in correcting the effects of presbyopia, as described below.

In order to maintain health, the cornea requires oxygen through exposure to air. Accordingly, the contact lens 120 can include various oxygenation structures to allow for sufficient oxygenation of the cornea. For instance, the contact lens 120 can include a dual-gap structure with a set of oxygen channels to allow for the flow of oxygen from outside the contact lens to the cornea. Contact lens oxygenation structures are described in greater detail in U.S. patent application Ser. No. 15/885,079, filed Jan. 31, 2018, the contents of which are incorporated herein by reference.

The electronic contact lens system of FIG. 1 may feel natural to the wearer because the contact lenses 120 and the necklace 110 are similar to normal contacts lenses and necklaces used in everyday life. For example, the contact lenses 120 may also function as regular contact lenses that provide refractive eyesight correction and the necklace 110 may be designed to look like ordinary jewelry. The necklace 110 may include additional hardware elements within its band 130 that can provide added functionality to the electronic contact lens system. For example, the necklace can communicatively couple to a smartphone, can receive configuration/reading mode instructions from an application running on the smartphone, and can provide the instructions to the contact lens. The necklace may also replace the smartphone rather than merely communicate with it.

As illustrated in FIG. 1, the power source is a necklace 110 that generates a time-varying magnetic field ("TVMF") and that can inductively couple to the contact lens 120. In other embodiments the power source may be any other type of device. For example, in some cases, the power source can be integrated into another type of wearable device such as a necktie, a scarf, a belt, the brim of a hat, the collar of a shirt, the hood of a jacket, the sleeve of a sweater, the front of a t-shirt, etc. In other examples, the power source can be an external device or structure. As an example, the power source can be a smart phone, a table-top box, or a power source coupled to the walls of an office.

Figure 2:
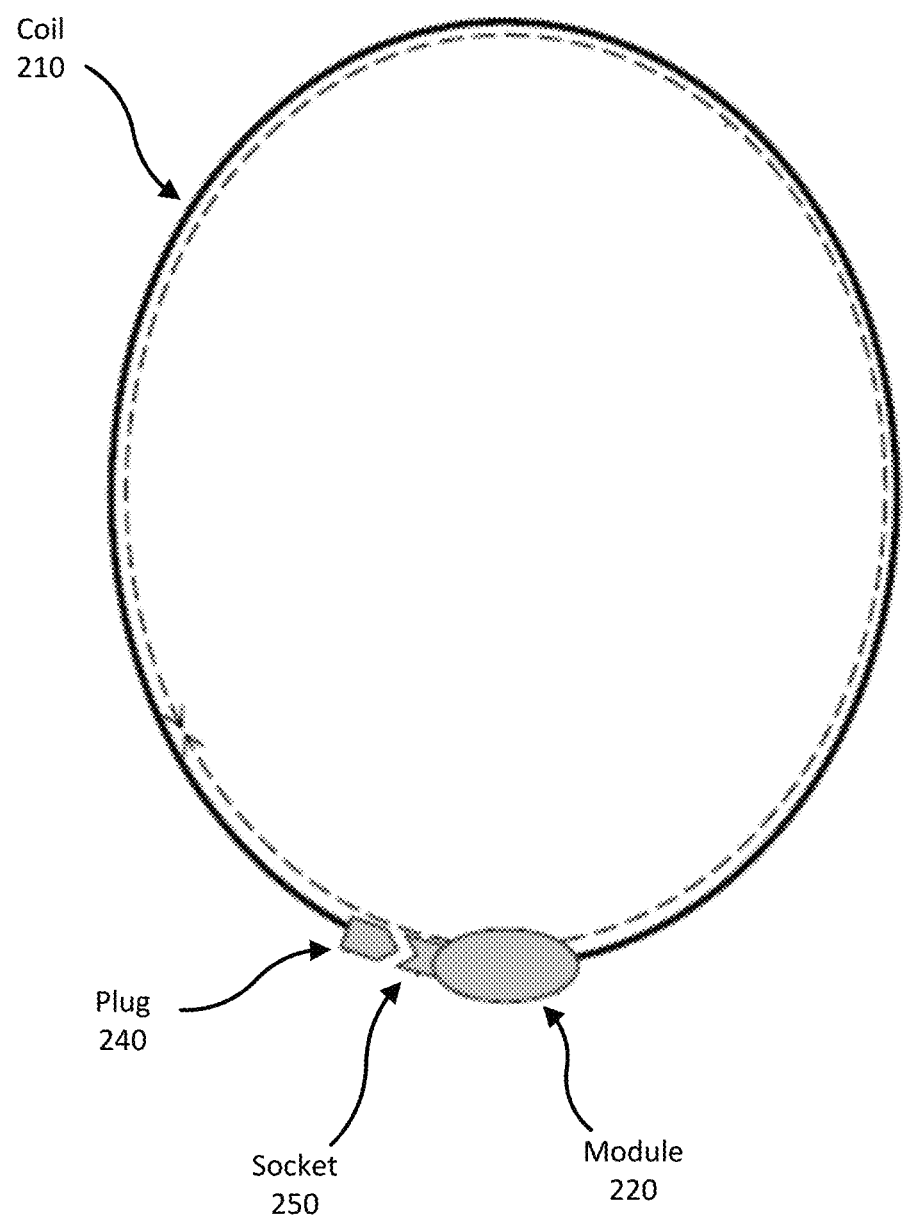
FIG. 2 is an illustration of a necklace of an electronic contact lens system.

FIG. 2 is an illustration of a necklace 110 of an electronic contact lens system 100. In the illustrated embodiment, the necklace 110 includes an electronic module 220 and a coil 210 of conductive material. The coil can be connected or disconnected with a plug 240 and a socket 250, or may be a single band without the plug and socket.

The necklace 110 includes various hardware elements, for instance within the electronic module 220, that enable functionality of the electronic contact lens system 100. For example, the necklace 110 can include hardware elements that generate a TVMF for transferring power to the contact lens 120. Additionally, the hardware elements can include one or more of: a power source such as a battery; a modulator to drive a radio-frequency current in the necklace coil that can be used to inductively couple to and communicate with the contact lens 120; a data modem to encode data on the radio-frequency signal; sensors such as microphones, cameras, inertial sensors, and GPS receivers; a cellular radio; a Wi-Fi radio; a Bluetooth radio; a graphics processing unit; and a microprocessor and memory. In various configurations, the hardware elements can be included in module 220 and/or may be distributed about the necklace band 130. Alternatively, when the electronic contact lens system 100 is connected to an external device or structure, any of the sensors, processors and other components mentioned above may be located in the device or structure.

It should be noted that in some embodiments, the power source is incorporated into the contact lens. For instance, the contact lens 120 can include an embedded battery that provides power to the electronic components of the contact lens. The battery can be charged by, for instance, a photovoltaic cell within the contact lens or inductively (e.g., while resting in a cleaning case overnight).

Presbyopia Correction

As noted above, the contact lens can include a liquid crystal matrix. The liquid crystal matrix can be located, for instance, within the contact lens and surrounding a center of the contact lens. When the contact lens is configured to operate in a reading mode, an aperture can be formed within the liquid crystal matrix. For instance, a controller of the contact lens can identify a first portion of the liquid crystal matrix corresponding to a user's visual axis, and can form an aperture within the liquid crystal matrix by configuring a second portion of the liquid crystal matrix surrounding the first portion to block light from passing through the second portion of the liquid crystal matrix.

Figure 3:
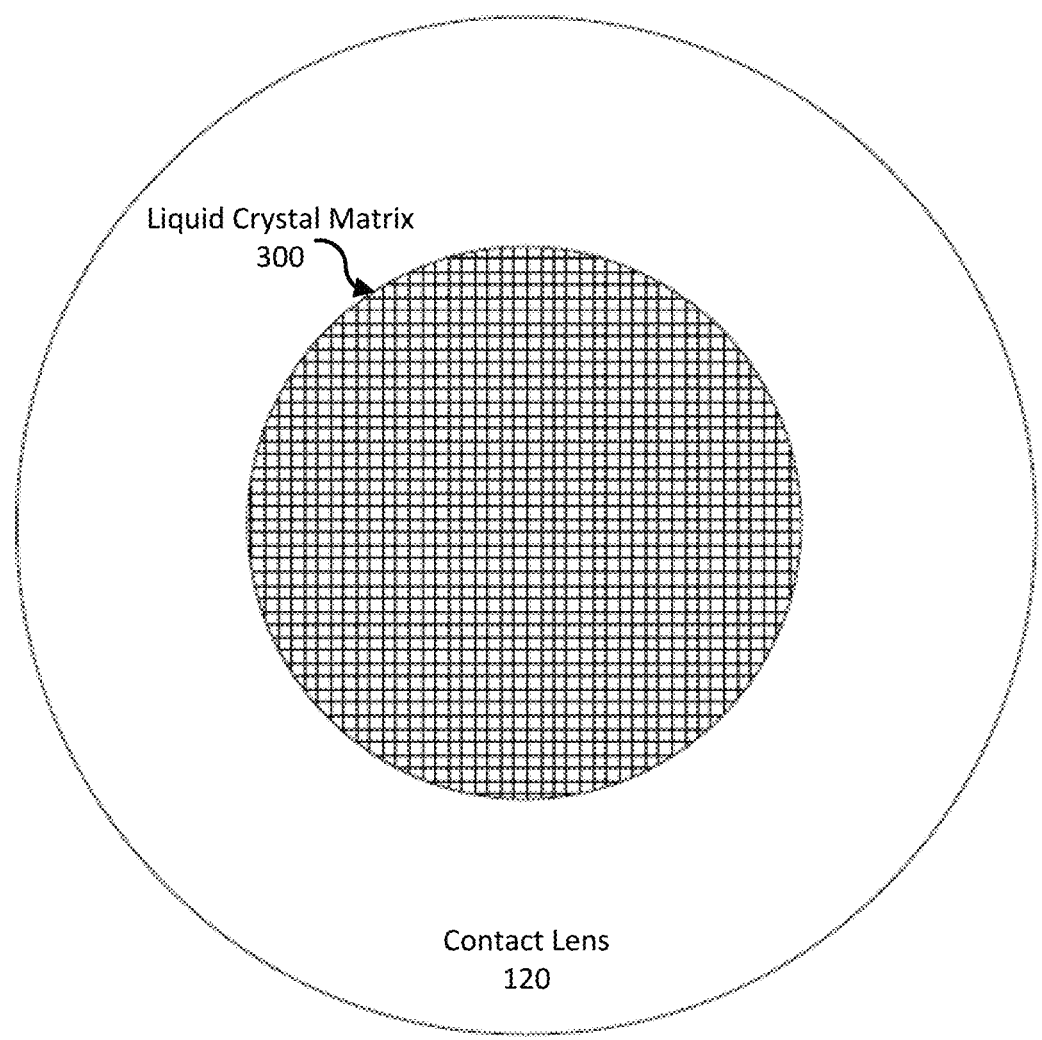
FIG. 3 is an illustration of a liquid crystal matrix within an electronic contact lens.

FIG. 3 is an illustration of a liquid crystal matrix within an electronic contact lens. The contact lens 120 of FIG. 3 includes a liquid crystal matrix 300. The size, shape, and location of the liquid crystal matrix 300 within the contact lens 120 can vary, but is generally centered on an area of the contact lens expected to correspond with a user's visual axis. The liquid crystal matrix 300 includes an array of elements, each of which can be individually configured to enable light to pass through the element or to block light from passing through the element. The elements of the liquid crystal matrix 300 can be square, rectangular, hexagonal, circular, or any other suitable shape.

Figure 4:
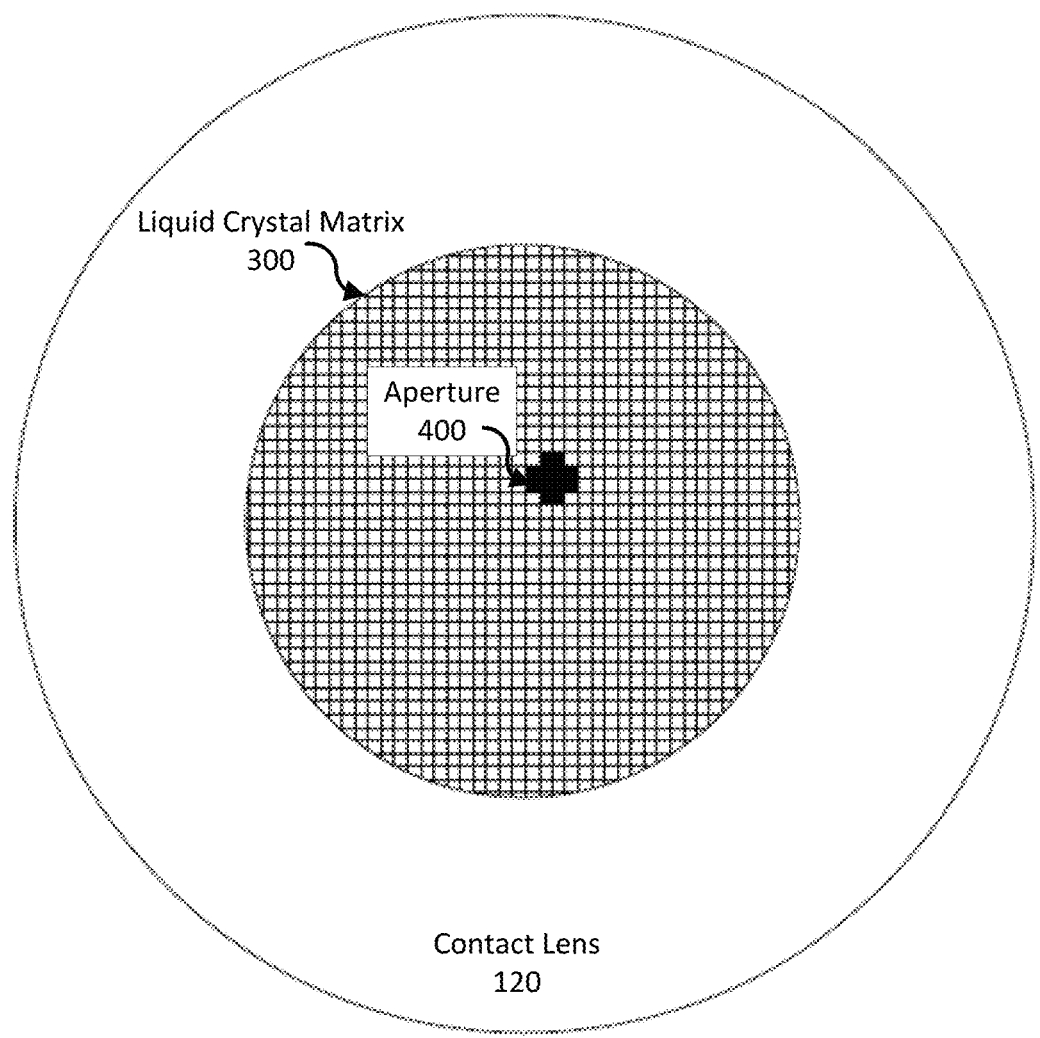
FIG. 4 is an illustration of an aperture within a liquid crystal matrix of an electronic contact lens.

A user can configure the contact lens 120 to include an aperture within the liquid crystal matrix 300, for instance in response to the contact lens being configured to operate in a reading mode. FIG. 4 is an illustration of an aperture within a liquid crystal matrix of an electronic contact lens, illustrating the aperture as black pixels and the opaque portions of the liquid crystal matrix as white pixels. The aperture 400 is formed within the liquid crystal matrix 300 by configuring the liquid crystal matrix elements corresponding to the aperture to allow light to pass through the liquid crystal matrix and configuring the liquid crystal matrix elements surrounding and immediately adjacent to the aperture to block light from passing through the liquid crystal matrix. In other words, an aperture is formed by blocking light from passing through the liquid crystal matrix of the contact lens around an area of the liquid crystal matrix through which light passes.

The size of the aperture 400 can be predetermined, or can be set by a user. In some embodiments, the size of the aperture 400 can be established during a calibration mode (described below), while in other embodiments, the size of the aperture can dynamically change during use of the contact lens 120 (for instance, in response to user input). As a size of an aperture 400 decreases, the brightness of the light passing through the aperture decreases and the depth of focus of the light passing through the aperture increases. Likewise, as a size of an aperture 400 increases, the brightness of the light passing through the aperture increase and the depth of focus of the light passing through the aperture decreases. Thus, a user can configure the size of the aperture 400 based on a tradeoff between a depth of focus provided by the aperture and a brightness of light passing through the aperture. In some embodiments, the size of the aperture varies between approximately 200 μm to 8 mm.

The shape of the aperture 400 may be circular (or may approximate a circle), rectangular, hexagonal, or any other suitable shape. Likewise, the shape of the portion of the liquid crystal matrix 300 surrounding the aperture 400 configured to block light (the "surrounding portion") may be circular (or approximately circular), ring-shaped, rectangular, hexagonal, and the like. The width of the surrounding portion of the liquid crystal matrix 300 can be predetermined or selected by the user. In some embodiments, an increase in the width of the surrounding portion of the liquid crystal matrix 300 can magnify the pinhole effects of the aperture, but at the cost of blocking additional light from passing through the liquid crystal matrix. In one example, the surrounding portion includes every liquid crystal matrix element bordering the aperture 400, creating a ring- or "O"-shaped portion within the liquid crystal matrix 300 that blocks light from passing through the liquid crystal matrix. In some embodiments, the aperture 400 is formed by configuring every liquid crystal matrix element outside of the aperture to block light.

An aperture 400 can be included within the liquid crystal matrix 300 in response to the contact lens 120 being configured to operate in a reading mode. The contact lens 120 may be configured to operate in a reading mode in response to an input from a user, such as a voice input, a hand gesture input, an eye movement input, or an input from a connected device (such as a smartphone, the necklace 110, or other devices). The contact lens 120 may also be configured to operate in a reading mode in response to detecting a vergence of both eyes of the user. For instance, contact lenses 120 can determine a gaze direction of each using cameras, accelerometers, or other circuits within the contact lens, and can detect a vergence of the eyes of the user when the gaze directions converge by a threshold amount. Likewise, the contact lens 120 can detect a vergence of the user's eyes by determining that a distance between fixed points within the contact lens is less than a threshold distance, for instance using circuits embedded within the contact lenses that are configured to determine a proximity to each other.

The contact lens 120 may be configured to operate in a reading mode in response to determining that the user is reading or determining that the user is looking at an object close to the user. For instance, a camera can be embedded within the contact lens 120 or an accessory or clothing item worn by the user to detect the presence of an object within a threshold distance of the user's face, or to detect text on an object within a threshold distance of the user's face. Further, the contact lens 120 may be configured to operate in a reading mode in response to detecting that the user is looking downward. For example, the user can be determined to be looking downward when a capacitive sensor included within the contact lens 120 detects a bottom eyelid of the user, or in response to a motion sensor within the contact lens (such as an accelerometer) detecting a downward motion or tilt of the eye of the user.

The aperture 400 can be included within the liquid crystal matrix 300 at a location determined to correspond to a visual axis of the user. The location within the liquid crystal matrix corresponding to a visual axis of the user can be determined when the contact lens 120 is configured to operate in a calibration mode. The calibration mode can be initiated by a user, for instance in response to a voice or hand gesture of the user, or in response to an input received via a connected device. Likewise, the calibration mode can be initiated upon initialization of the contact lens 120, upon activation of electronics of the contact lens (e.g., upon startup), or during a calibration procedure, for instance performed by an optometrist or other professional. In some embodiments, the contact lens 120 can be re-calibrated during use, for instance periodically (e.g., after the passage of a threshold interval of time since a previous calibration) or in response to a request from a user.

When the contact lens 120 is configured to operate in the calibration mode, the liquid crystal matrix of the contact lens may be configured to include a test aperture within the liquid crystal matrix at a location estimated to correspond to the user's visual axis. In response to the test aperture, a user can provide an input indicating a location within the contact lens 120 or the liquid crystal matrix 300 corresponding to the user's visual axis. For instance, a user may provide an input to move the test aperture via a connected device to a location corresponding to the user's visual axis (e.g., a location overlapping or adjacent to the location within the liquid crystal matrix through which the user's visual axis passes). Likewise, an eye movement of the user, a blink pattern of the user, a hand gesture of the user, or a voice command from the user may indicate a direction from the location estimated to correspond to the user's visual axis to the actual location corresponding to the user's visual axis.

In response to the input from the user, the contact lens 120 can move the test aperture, for instance in an indicated direction towards the location corresponding to the user's visual axis. This process can iterate until the test aperture is located within the liquid crystal matrix 300 at a location corresponding to the user's visual axis. In addition, the location within the liquid crystal matrix 300 can be indicated by a user via an input provided through an interface of a smartphone or connected device. It should be noted that in other embodiments, the liquid crystal matrix 300 can be configured to include test patterns or images other than a test aperture for use in calibrating the contact lens 120. The location within a contact lens corresponding to a user's visual axis may also be determined in other ways, for instance as described in U.S. application Ser. No. 15/977,985, filed on May 11, 2018, the contents of which are incorporated by reference herein in their entirety.

Figure 5:
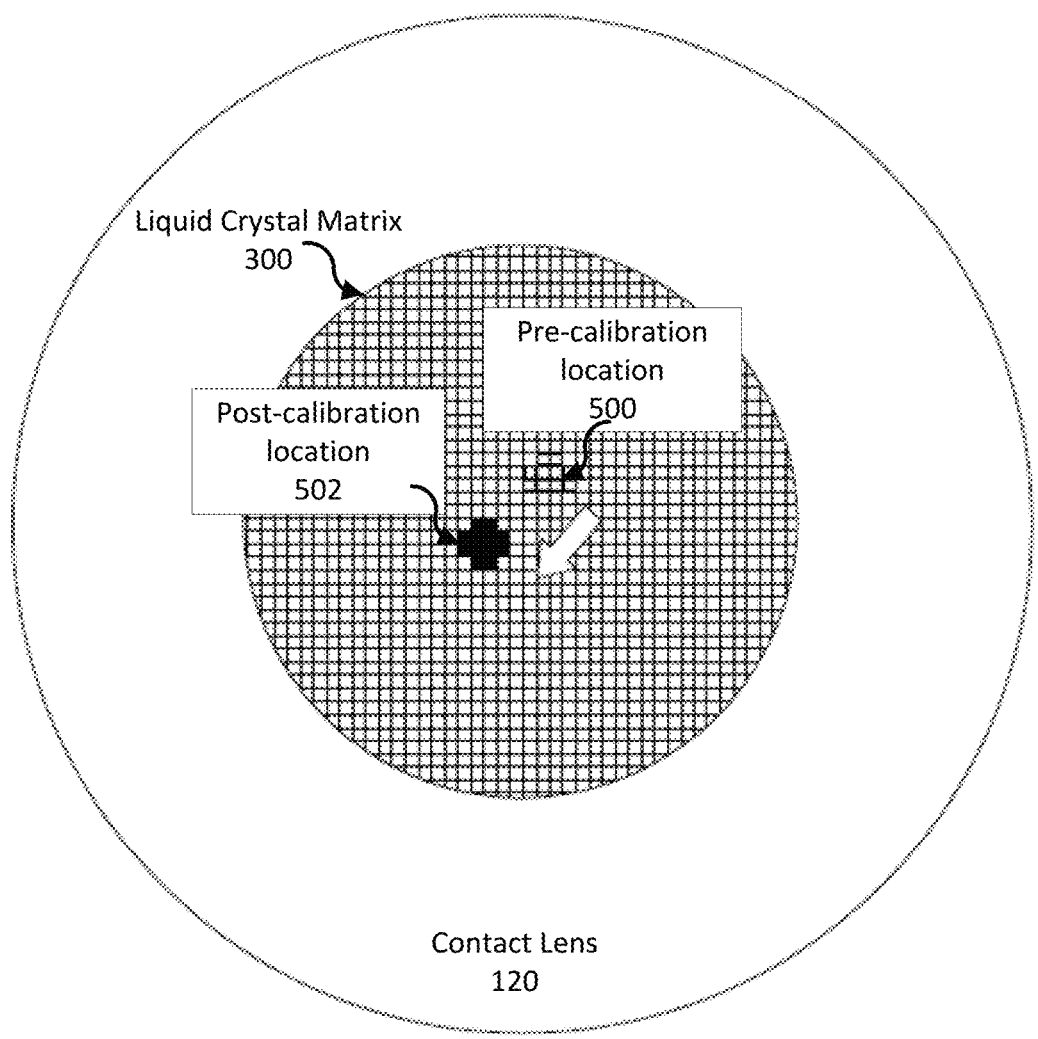
FIG. 5 is an illustration of a movement of an aperture within a liquid crystal matrix during a calibration of an electronic contact lens.

FIG. 5 is an illustration of a movement of an aperture within a liquid crystal matrix during a calibration of an electronic contact lens. In the example of FIG. 5, a test aperture is initially displayed at a pre-calibration location 500 within the liquid crystal matrix 300. A user then provides an input to move the aperture to the location 502 within the liquid crystal matrix 300. For instance, the location 500 of the test aperture may appear off-center to the user, and the user can provide an input via a connected smartphone to center the aperture on the user's visual axis at the location 502 within the liquid crystal matrix 300 (or simply to move the aperture to a location within the liquid crystal matrix 300 that is acceptable to the user). The contact lens 120, when subsequently configured to operate in the reading mode, can configure the liquid crystal matrix 300 to include an aperture at the location 502 determined during calibration.

In addition to identifying a location within the liquid crystal matrix 300 corresponding to a user's visual axis, one or more other properties of aperture can be selected during calibration. For example, a size of the aperture can be selected by a user during calibration. A test aperture can be displayed to the user, and the user can increase or decrease a size of the test aperture, for instance using a hand or eye gesture, via an input to a connected device, and the like. If the user provides an input requesting an increase in the size of the aperture, the diameter of the test aperture can be increased and vice versa. In other examples, a shape of the aperture and/or any other suitable property of the contact lens can be selected by a user during calibration.

Once the contact lens is calibrated, the contact lens can be configured to operate in a normal operating mode, for instance in response to an input from the user requesting operation in the normal operating mode. When the contact lens is configured to operate in the normal operating mode, the elements of the liquid crystal matrix 300 are configured to allow all light to pass through the liquid crystal matrix. In other words, when the contact lens 120 is configured to operate in the normal operating mode, the contact lens may function without the use of apertures within the liquid crystal matrix 300. The user can then configure the contact lens to operate in a reading mode (for instance, via an input associated with enabling reading mode), and the contact lens 120 can form an aperture within the liquid crystal matrix 300 at a location determined during calibration to correspond to a user's visual axis. The user can subsequently configure the contact lens 120 to return to the normal operating mode, and the aperture within the liquid crystal matrix 300 can be removed from the liquid crystal matrix by configuring all of the elements of the liquid crystal matrix to allow light to pass through.

Figure 6:
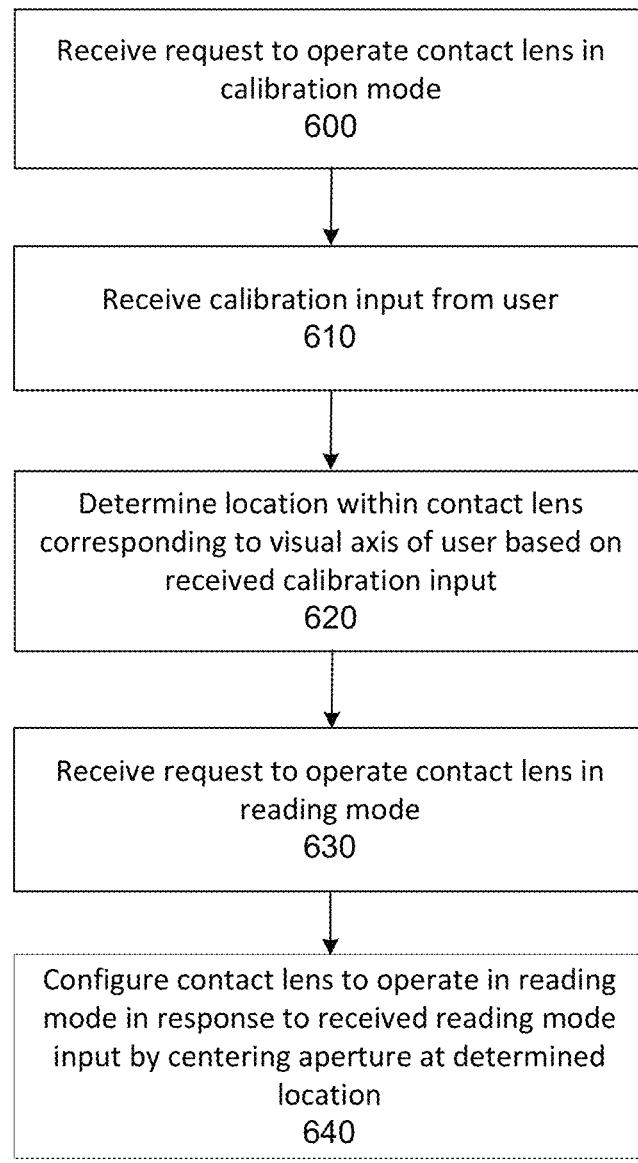
FIG. 6 is a flow chart of a process of calibrating and operating an electronic contact lens in a reading mode.

FIG. 6 is a flow chart of a process of calibrating and operating an electronic contact lens in a reading mode. A request to operate a contact lens in a calibration mode is received 600. In response, a liquid crystal matrix of the contact lens is configured to include a test aperture or other test pattern. A calibration input is received 610 from a user in response to the text aperture or test pattern. Based on the received calibration input, a location within the contact lens is determined 620 to correspond to a visual axis of the user.

After the contact lens has been calibrated, a request is received 630 to operate the contact lens in a reading mode. In response, the contact lens is configured to configured 640 to operate in the reading mode by centering an aperture within the liquid crystal matrix at the location determined during calibration to corresponding to the visual axis of the user. The aperture increases the depth of focus of light passing through the aperture, enabling a user suffering from presbyopia to focus on objects (such as a book) close to the user's face.

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A contact lens comprising:
    a liquid crystal matrix embedded within the contact lens, the liquid crystal matrix comprising an array of elements, each of which can be individually controlled to enable light to pass through the element or to block light from passing through the element; and
    a controller coupled to the liquid crystal matrix, wherein:
        in a reading mode, the controller controls elements within an aperture to pass light and controls elements outside the aperture to block light;
        in a normal operating mode, the controller controls all elements to pass light; and
        in a calibration mode, the controller receives an input from a user indicating a location within the liquid crystal matrix corresponding to a center of the user's visual axis and adjusts the aperture within the contact lens to be centered on the location within the liquid crystal matrix corresponding to the center of the user's visual axis.

2. The contact lens of claim 1, wherein, in the configuration mode, the controller: controlsthe liquid crystal matrix to indicate a candidate location within the liquid crystal matrix corresponding to the center of the user's visual axis;
    wherein the received input from the user indicates a direction from the candidate location within the liquid crystal matrix to the location within the liquid crystal matrix corresponding to the center of the user's visual axis.

3. The contact lens of claim 1, wherein the input from the user comprises one or more of: a voice input, a hand gesture input, an eye gesture input, and an input received from a device.

4. The contact lens of claim 1, wherein the controller operates in the calibration mode in response to one or more of: an initialization of the contact lens, a passage of a threshold interval of time since a previous calibration, and a user request for calibration.

5. The contact lens of claim 1, wherein the controller operates in the reading mode in response to a voice input or a hand gesture input.

6. The contact lens of claim 1, wherein the controller operates in the reading mode in response to detecting a vergence of both eyes of the user.

7. The contact lens of claim 1, wherein the controller operates in the reading mode in response to determining that the user is reading.

8. The contact lens of claim 1, wherein the controller operates in the reading mode in response to detecting that the user is looking downward.

9. The contact lens of claim 8, wherein detecting that the user is looking downward comprises detecting a bottom eyelid of the user by a capacitive sensor within the contact lens.

10. The contact lens of claim 8, wherein detecting that the user is looking downward comprises detecting downward motion of an eye of the user by an accelerometer within the contact lens.

11. A contact lens comprising:
    a liquid crystal matrix embedded within the contact lens, the liquid crystal matrix comprising an array of elements, each of which can be individually controlled to enable light to pass through the element or to block light from passing through the element; and
    a controller coupled to the liquid crystal matrix, wherein:
        in a reading mode, the controller controls elements within an aperture to pass light and controls elements outside the aperture to block light;
        in a normal operating mode, the controller controls all elements to pass light; and
        in a calibration mode, the controller selects a size of the aperture within the contact lens.

12. The contact lens of claim 11, wherein the controller selects the size of the aperture based on feedback from the user.

13. The contact lens of claim 11, wherein the controller selects the size of the aperture based on one of a depth of focus associated with the aperture and a brightness associated with the aperture.

14. The contact lens of claim 11, wherein, in the reading mode, the controller adjusts the size of the aperture within the contact lens in response to an input from the user.

15. A method for operating an electronic contact lens, the electronic contact lens containing a liquid crystal matrix with an array of elements, each of which can be individually controlled to enable light to pass through the element or to block light from passing through the element, the method comprising:
    operating the electronic contact lens in a normal operating mode, in which all elements pass light;
    receiving a request to operate the electronic contact lens in a reading mode; and
    in response to the request, operating the electronic contact lens in the reading mode, in which elements within an aperture pass light and elements outside the aperture block light;
    receiving a second request to operate the electronic contact lens in a calibration mode; and
    in response to the second request, operating the electronic contact lens in the calibration mode, in which the aperture within the contact lens is centered on a location within the liquid crystal matrix corresponding to a center of a user's visual axis, wherein the location within the liquid crystal matrix corresponding to the center of the user's visual axis is determined based on a calibration input received from the user.

16. The method of claim 15, wherein the electronic contact lens operates in the calibration mode in response to one or more of: an initialization of the contact lens, a passage of a threshold interval of time since a previous calibration, and a user request for calibration.

17. The method of claim 15, wherein, in the calibration mode, a size of the aperture within the contact lens is selected.

18. The method of claim 15, wherein the electronic contact lens operates in the reading mode in response to a determination that the user is reading.

* * * * *